(12) United States Patent
Roessler et al.

(10) Patent No.: US 12,013,022 B2
(45) Date of Patent: Jun. 18, 2024

(54) METHOD FOR PRODUCING A SINTERED COMPONENT WITH A TOOTHING

(71) Applicant: Miba Sinter Austria GmbH, Laakirchen (AT)

(72) Inventors: Horst Roessler, Krenglbach (AT); Martin Ohler, Vorchdorf (AT); Helmut Aichinger, Ohlsdorf (AT); Alexander Mueller, Altmuenster (AT)

(73) Assignee: Miba Sinter Austria GmbH, Laakirchen (AT)

( * ) Notice: Subject to any disclaimer, the term of this patent is extended or adjusted under 35 U.S.C. 154(b) by 80 days.

(21) Appl. No.: 17/740,558

(22) Filed: May 10, 2022

(65) Prior Publication Data
US 2022/0390000 A1 Dec. 8, 2022

(30) Foreign Application Priority Data
Jun. 8, 2021 (AT) .............................. A 50463/2021

(51) Int. Cl.
| | | |
|---|---|---|
| *F16H 55/17* | (2006.01) | |
| *B22F 3/16* | (2006.01) | |
| *B22F 3/24* | (2006.01) | |
| *B22F 5/08* | (2006.01) | |
| *C22C 38/44* | (2006.01) | |
| *C23C 8/26* | (2006.01) | |
| *C23C 8/32* | (2006.01) | |
| *C23C 8/38* | (2006.01) | |

(Continued)

(52) U.S. Cl.
CPC ............... *F16H 55/17* (2013.01); *B22F 3/16* (2013.01); *B22F 3/24* (2013.01); *B22F 5/08* (2013.01); *C22C 38/44* (2013.01); *C23C 8/26* (2013.01); *C23C 8/32* (2013.01); *C23C 8/38* (2013.01); *F16H 55/06* (2013.01); *F16H 55/08* (2013.01); *B22F 2301/35* (2013.01); *F16H 2055/176* (2013.01)

(58) Field of Classification Search
CPC .... B22F 5/08; B22F 3/24; B22F 3/168; B22F 3/02; F16H 55/17; F16H 55/08; F16H 55/088; F16H 55/0806
USPC .......................................................... 74/457
See application file for complete search history.

(56) References Cited

U.S. PATENT DOCUMENTS

| | | |
|---|---|---|
| 5,701,574 A | 12/1997 | Derflinger et al. |
| 8,783,080 B2 | 7/2014 | Koller et al. |
| 2004/0086413 A1 | 5/2004 | Rau et al. |

(Continued)

FOREIGN PATENT DOCUMENTS

| | | |
|---|---|---|
| AT | 505 118 A1 | 10/2008 |
| AT | 515 352 A2 | 8/2015 |
| DE | 196 04 386 A1 | 8/1996 |

*Primary Examiner* — Jake Cook
(74) *Attorney, Agent, or Firm* — Collard & Roe, P.C.

(57) ABSTRACT

A method for producing a sintered component, in particular an annular sintered component, with a toothing, having teeth with tooth roots, tooth tips and tooth flanks, includes the steps of pressing a powder to form a green compact, sintering the green compact, and hardening the sintered component, wherein after sintering, the tooth flanks and possibly the tooth tips are post-compacted and subsequently undergo post-processing by machining, and wherein a transition region between the tooth flanks and the tooth roots has an undercut design, and post-compaction of the tooth flanks is carried out only up to this transition region.

11 Claims, 3 Drawing Sheets

(51) Int. Cl.
  *F16H 55/06*  (2006.01)
  *F16H 55/08*  (2006.01)

(56) References Cited

U.S. PATENT DOCUMENTS

| | | | |
|---|---|---|---|
| 2008/0209730 A1* | 9/2008 | Kotthoff | B22F 5/08 |
| | | | 29/893.3 |
| 2013/0008278 A1* | 1/2013 | Mueller | B22F 5/08 |
| | | | 74/457 |
| 2014/0020442 A1 | 1/2014 | Menendez-Castanedo et al. | |
| 2015/0211621 A1 | 7/2015 | Sandner et al. | |

\* cited by examiner

METHOD FOR PRODUCING A SINTERED COMPONENT WITH A TOOTHING

CROSS REFERENCE TO RELATED APPLICATIONS

Applicant claims priority under 35 U.S.C. § 119 of Austrian Application No. A 50463/2021 filed Jun. 8, 2021, the disclosure of which is incorporated by reference.

BACKGROUND OF THE INVENTION

1. Field of the Invention

The invention relates to a method for producing a sintered component, in particular an annular sintered component, with a toothing having teeth with tooth roots and tooth flanks, comprising the steps of pressing a powder to form a green compact, sintering the green compact, and hardening the sintered component once it has been sintered, wherein after sintering, the tooth flanks and possibly the tooth tips are post-compacted and subsequently undergo post-processing by machining.

Furthermore, the invention relates to a sintered component, in particular an internal gear, with a toothing having teeth with tooth roots and tooth flanks, wherein the tooth flanks and possibly the tooth tips are post-compacted and undergo post-processing by machining.

2. Description of the Related Art

It is known that, in torque-transmitting toothings, the greatest stress due to the tooth forces is located in the region of the fillet radius at the root of the teeth. The tension at this location is at its maximum at the surface and decreases towards the inside of the tooth. It is further known to locally reduce or eliminate the porosity of a sintered component by means of a post-compaction process, for example rolling or calibrating, in order to thus improve the component strength. The post-compaction may take place in the region of the tooth tip, the tooth flank, and the tooth root. Merely by way of example, AT 505118 A1 should be mentioned.

To achieve the desired strength, high-strength sintered gears may be case-hardened and/or carbonitrided. In this process, carbon and/or carbon and nitrogen enter the surface resulting in martensite, and stresses occur. These lead to warpages, among other things, and in most cases of application, require hard fine machining of the toothing in particular. This hard fine machining causes additional costs, especially in the case of internal gears.

In order to avoid this shortcoming, AT 515352 A2 has suggested a method for producing an, in particular annular, sintered component with a toothing having teeth with tooth roots and tooth flanks, in near net shape or net shape quality, comprising the steps of powder pressing, sintering and hardening, wherein hardening is carried out by means of plasma nitriding or plasma nitrocarburizing, wherein the tooth roots are produced with a tooth root fatigue strength $\sigma_{F,lim}$ according to DIN 3990 of at least 200 MPa. After sintering, only the tooth flanks and possibly the tooth tips are compacted, in particular cold compacted. Additionally, the tooth flanks are compacted to a higher degree than the tooth roots. By means of plasma nitriding and/or plasma nitrocarburizing for hardening the sintered component, process-related warpages, as they occur in case hardening, can be avoided.

In the case of sintered internal gears, which are produced from powders with elements increasing the strength, such as chromium, in connection with plasma nitriding, the problem occurs with respect to the compaction of the edge zone that due to the great degree of deformation during post-compaction in the tooth root region, in particular in the region of the tooth root fillet, material defects occur.

SUMMARY OF THE INVENTION

The object of the invention is to create a toothed sintered component, in particular an internal gear, with improved resilience.

The object is achieved by the initially mentioned method, according to which it is provided that a transition region between the tooth flanks and the tooth roots is formed to be undercut, and that the post-compaction of the tooth flanks is carried out only up to said transition region.

Additionally, the object of the invention is achieved by the initially mentioned sintered component, in which a transition region between the tooth flanks and the tooth roots is formed to be undercut, and the post-compaction of the tooth flanks is carried out only up to said transition region.

In this regard, it is advantageous that the sintered components (thus produced) have an improved tooth root strength as these regions are not deformed any more after sintering and thus, defects in these regions, such as an unfavorable pore structure and/or micro cracks, etc., are prevented. Thus, toothings on sintered components, such as in particular internal gears, having very small fillet radii of the tooth roots can be produced more easily.

For improving these effects, it may be provided according to an embodiment variant of the invention that the post-compaction is carried out only up to a region which is defined by the usable root diameter plus 10% of the usable root diameter. The usable root diameter defines the useful range of the teeth of the toothing, which useful range is measured from the tip circle of the toothing to the usable root circle and in which the tooth flanks of the gear and of a corresponding mating gear roll on one another. Below the usable root circle up to the root circle, there is no contact between the teeth of the gears during rolling.

According to a further embodiment variant of the invention, the tooth roots are preferably produced without allowance upon pressing of the powder, so that after sintering and hardening the sintered component, the tooth roots are already finished and available without any further processing.

According to another embodiment variant of the invention, it may be provided that the post-processing by machining of the tooth flanks is carried out maximally up to a region, the radius of which deviates from the tooth root circle radius by 0.08% to 12%. Thereby, the lifetime of a forming tool, in particular of a honing ring, is to be improved as critical tool regions are not in contact with the sintered component due to the undercuts of the teeth. Thus, a more solid tool design is also possible.

The advantages of the invention make a particular impact with powders for the sintered component which consist of 0.1 wt. % to 5 wt. % chromium, 0.1 wt. % to 0.8 wt. % carbon, 0 wt. % to 2 wt. % molybdenum, 0 wt. % to 2 wt. % nickel, remainder iron. Sintered component made of these materials have a relatively high sinter hardness in the range of 180 HB. Here, dispensing with forming and post-processing the tooth roots has a particularly effective impact, in particular if internal gears are made from these powders.

For these reasons, it is also advantageous according to a further embodiment variant of the invention if sintered components are produced therewith, the tooth roots of which have a rounded design, wherein a fillet radius is selected from a range of 0.2 mm to 8 mm.

Due to the reduction of component warpages, it is advantageous for avoiding tooth root processing if hardening is carried out by means of plasma nitriding or plasma nitrocarburizing.

According to a further embodiment variant of the invention, it may be provided that the toothing has a module in a range of 0.3 mm to 3 mm. This is due to the fact that in the course of the invention, it was found that the positive effects described above occur in a more pronounced manner with gear sizes corresponding to a module in this range.

As already mentioned multiple times, preferably an internal gear is produced using the method, as, surprisingly, processing a gear with an internal toothing is different from processing a gear with an external toothing and thus, knowledge from processing gears with an external toothing cannot simply be transferred to gears with an internal toothing, particularly with respect to post-compaction.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Information regarding standards always refer to the latest version of said standards valid at the date of filing of the original priority application unless explicitly stated otherwise.

Figure 1:
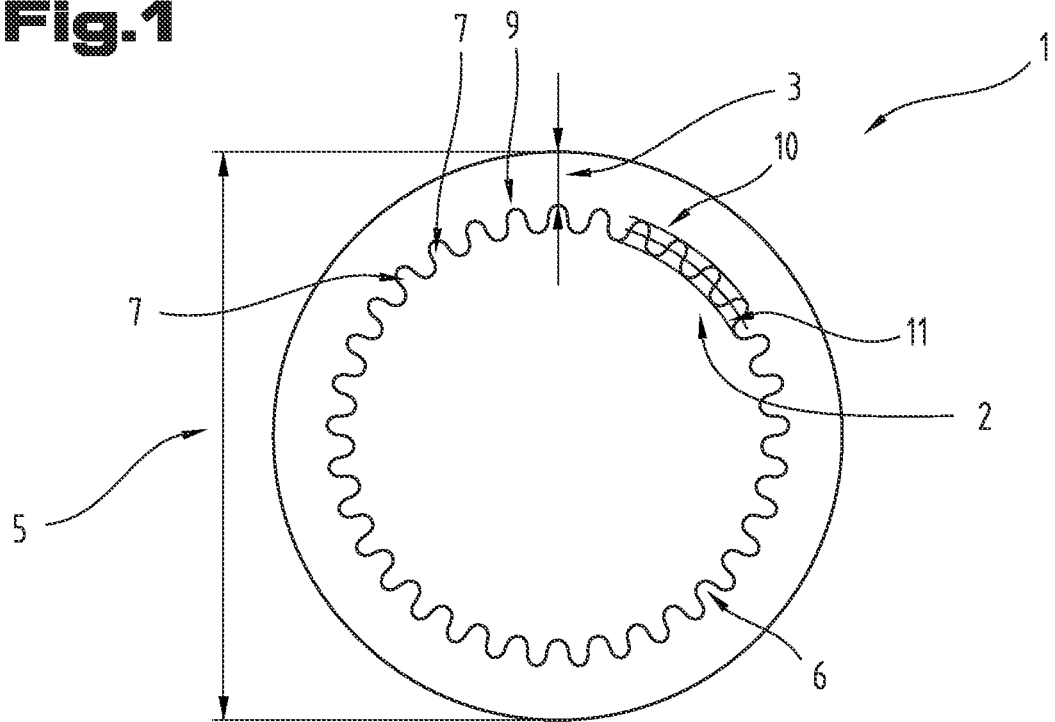
FIG. 1 shows a sintered component in the form of an internal gear.
Figure 2:
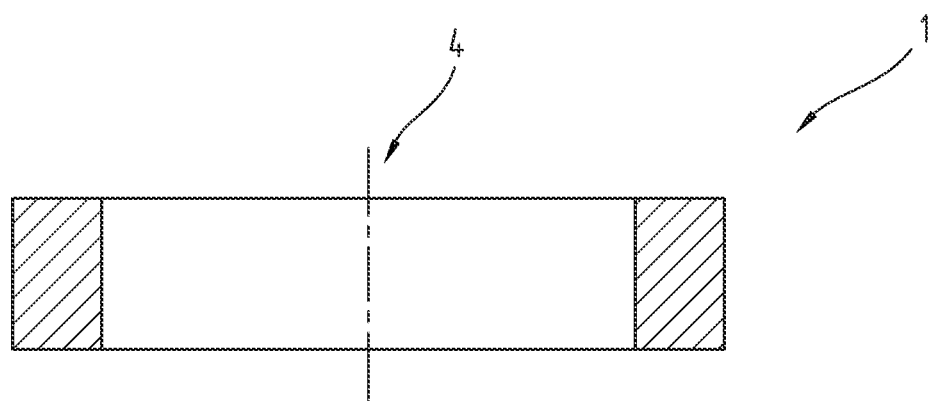
FIG. 2 shows the sintered component according to FIG. 1 in cross section.

FIGS. 1 and 2 show a metallic sintered component 1 in the form of an internal gear. This internal gear has an annular design and has a toothing 2 in the form of an internal toothing. As such sintered components 1 are known per se, any further explanation can be dispensed with. The metallic sintered component 1 may also be a gear (wheel), a timing belt wheel, a sprocket, etc. Furthermore, the sintered component 1 may have a spur toothing or a helical toothing.

It should be noted at this point already that the method described below cannot only be used for producing internal gears. In fact, using this method, sintered components 1, in particular annular sintered components 1 per se, can be produced, which possibly have an external toothing annular generally a toothing 2 in place of or in addition to the internal toothing.

The sintered component 1 has a thickness 3 in the radial direction, which extends perpendicularly to an axial direction 4. In this regard, the thickness 3 is measured between the root circle of the intermediate ring and a maximum outer diameter 5 of the sintered component 1, as it is shown in FIG. 1. If the sintered component 1 only has an external toothing, the thickness 3 is accordingly to be measured between the root circle of the toothing 2 and the inner diameter. If the sintered component 1 has both an internal toothing and an external toothing, the thickness 3 is to be measured between the two root circles of the toothings 2.

The toothing 2 comprises teeth 6. The teeth 6 have tooth flanks 7, tooth tips 8, and tooth roots 9.

Regarding the definition of the regions of the tooth flanks 4, the tooth tips 5, and the tooth roots 6, reference is made to DIN 3998.

A tooth root 9 is the region between the root circle 10 and the start of the engagement region of a further gear.

The tooth flank 7 is the region of engagement of the further gear. The tooth flank thus adjoins the tooth root 9.

The tooth tip 8 adjoins the tooth flank 7 and is the region between the engagement end of the further gear and the tip circle 11.

The production of the sintered component 1 is carried out according to a sintering method. For this process, a green compact is produced in a corresponding pressing mold from a sintering powder, which can be made from the individual (metallic) powders by means of mixing, wherein the powders may possibly be used in a pre-alloyed state. Preferably, the green compact has a density of more than 6.8 g/cm$^3$.

The green compact is subsequently dewaxed at customary temperatures and sintered in one or two stages and/or multiple stages and preferably cooled down to room temperature afterwards. The sintering process may for example be carried out at a temperature of between 900° C. and 1300° C.

As these approaches and the method parameters used here are known from the prior art, reference is made to the relevant prior art in order to avoid repetitions in this regard.

A powder with the following composition is preferably used as a sintering powder from which the sintered component 1 is made:

0.1 wt. % to 5 wt. % chromium
0.1 wt. % to 0.8 wt. % carbon
0 wt. % to 2 wt. % molybdenum
0 wt. % to 2 wt. % nickel
remainder iron.

Particularly as a result of the chromium and molybdenum contents, higher hardness values can be achieved.

Common processing aids, such as pressing aids and/or binding agents, can also possibly be added to the sintering powder in common quantitative proportions. In this regard, these quantitative proportions relate to the entirety of the powder mixture. However, the quantitative proportions of the metallic powders stated above relate to the entirety of the metallic proportions.

However, the sintering powder may also have a different composition. For example, the sintering powder may comprise 0.05 wt. % to 0.5 wt. % carbon, 0.5 wt. % to 1 wt. % molybdenum, 0 wt. % to 2 wt. % other alloying elements, such as for example Ni, Cr, Co, Si, Cu, etc., wherein the remainder is made up of iron.

After sintering, the sintered component 1 is hardened to improve the wear resistance. Hardening is preferably carried out by means of plasma nitriding or plasma nitrocarburizing, for which at least one nitrogen source and possibly at least one carbon source are available in the treatment chamber for the sintered components 1. The plasma treatment of the sintered component 1 is carried out with the following parameters. The sintered components 1 are preferably cleaned before the heat treatment in the plasma, possibly after previous removal of oils and fats in a cleaning system. Preferably, cleaning takes place by means of sputtering.
Temperature During Plasma Nitriding:

The temperature is selected from a range of 350° C. to 600° C., in particular selected from a range of 400° C. to 550° C. The temperature may possibly vary over the duration of the process, wherein, however, in any case, the temperature falls within the mentioned temperature range.

Duration of plasma nitriding: 1 hour to 60 hours
Atmosphere During Plasma Nitriding:

The atmosphere in the plasma chamber may be hydrogen or nitrogen or argon or a mixture thereof, for example a mixture of hydrogen and nitrogen. The ratio of the volume fractions of hydrogen and nitrogen in this mixture may be selected from a range of 100:1 to 1:100. The volume fractions of hydrogen and nitrogen may possibly vary over the duration of the process, wherein, however, in any case, the ratios fall within the mentioned ranges. Further process gases may be present, wherein their total proportion of the atmosphere amounts to a maximum of 30 vol %.
Voltage:

The electrical voltage between the electrodes is selected from a range of 300 V to 800 V, in particular from a range of 450 V to 700 V. In this regard, it is also possible that the voltage is varied during the plasma nitriding treatment of the sintered components 1.

In this regard, both at least two separate electrodes may be used and the sintered component 1 itself may be switched as an electrode.
Pressure Range:

The pressure in the treatment chamber during the plasma treatment of the sintered components 1 may be selected from a range of 0.1 mbar to 10 mbar, in particular from a range of 2 mbar to 7 mbar.

By means of plasma nitriding or plasma nitrocarburizing, the sintered components 1 are hardened in the regions close to the surface while forming a layer. In this process, the nitrogen content and possibly the carbon content in the sintered component 1 is increased due to the incorporation of nitrogen and possibly carbon in said layer. The term "increased" also includes an increase of these proportions starting from 0 wt. % before the plasma treatment.

Although plasma nitriding or plasma nitrocarburizing is the preferred hardening process, other hardening processes known in sintering technology may also be used.

In the course of the process, it is provided that the tooth flanks 7 are post-compacted. Preferably, the tooth tips 8 are also post-compacted. Thus, a compacted edge zone 12 is formed, as it can be seen in FIG. 3, which shows a tooth 6 of the toothing 2 of the sintered component 1 according to FIG. 1. It is provided that only the tooth flanks 7 and possibly the tooth tips 8 are compacted, in particular cold-compacted. The tooth roots 9 are not compacted after sintering.

Post-compaction preferably takes place after sintering and before hardening, although it may also be carried out after hardening.

Post-compaction may take place, for example, by means of rolling the toothing 2 against a master mold, wherein the master mold has a toothing which engages with the toothing 2 of the sintered component 1. However, post-compaction may also take place in a pressing mold, for example a calibration die, by means of which a corresponding pressure can be exerted on the tooth flanks 7 and possibly the tooth tips 8. Calibrating serves to increase the component geometry, thus adjusting the actual dimensions to the target dimensions.

For post-compacting the tooth flanks 7 and possibly the tooth tips 8, a compacting pressure can be applied, which is selected from a range of 150 MPa to 1200 MPa, in particular 300 MPa to 1200 MPa.

By means of post-compacting, the regions close to the surface of the tooth flanks 7 and possibly of the tooth tips 8 have a density which corresponds to at least 95% of the density of the full material (full density). The regions close to the surface of the tooth roots 9 may have a density which corresponds to between 78% and 93% of the density of the full material (full density).

Post-compaction is carried out particular up to a depth in the sintered component 1, which amounts to between 0.08 mm and 0.8 mm, in particular between 0.08 mm and 0.4 mm, measured from the surface of the sintered component 1. The region of the sintered component 1 located under the compacted region, that is the core of the sintered component 1, has a core density, which corresponds at least approximately to the density of the sintered component 1 after sintering.

Figure 3:
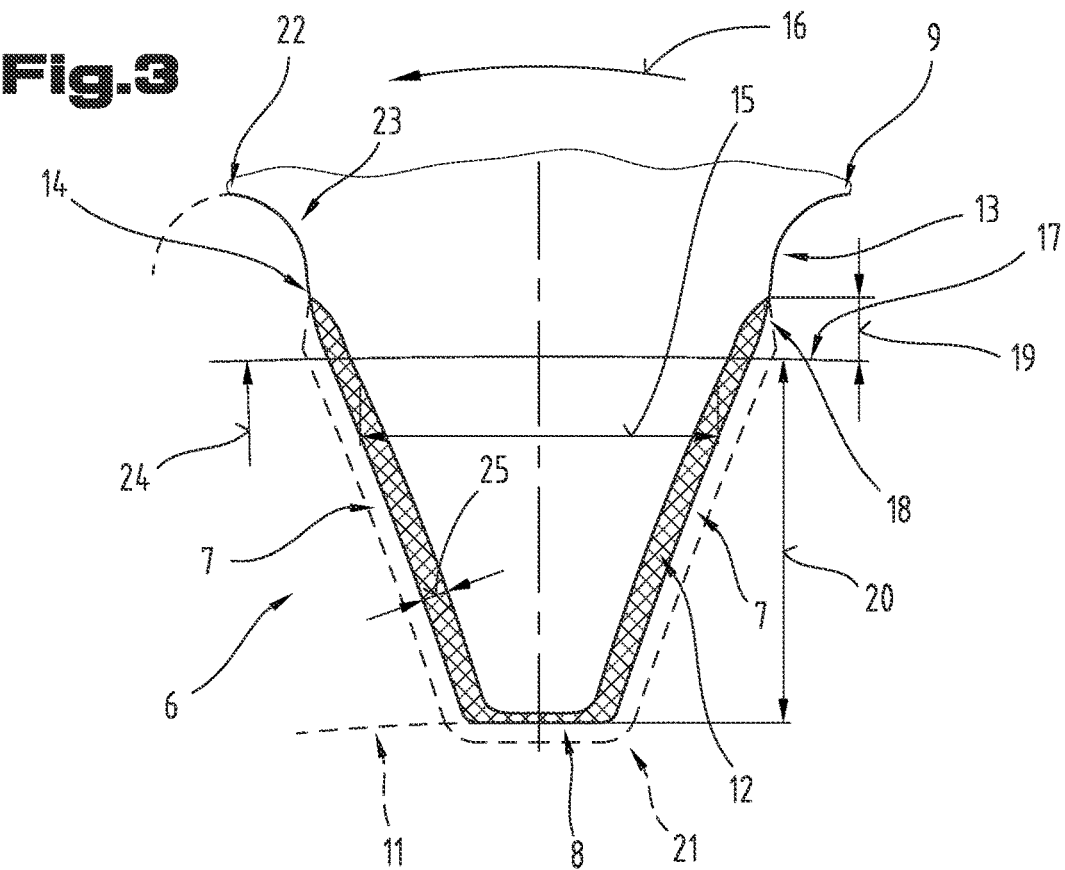
FIG. 3 shows a cutout from the sintered component according to FIG. 1.

As can be seen in FIG. 3, a transition region 13 is formed between the tooth flanks 7 and the tooth roots 9. The transition region 13 begins in the tooth flanks 7 at the point where they are not post-compacted anymore.

The transition region 13 has an undercut design and/or has an undercut 14. In this regard, the undercut 14 refers to the course of the tooth flank 7.

The undercut 14, which can also be referred to as a protuberance, is in particular arranged at that location in the tooth flanks 7, at which the post-compaction ends, as can be seen in FIG. 3.

The undercut may have a rounded design, as shown in FIG. 3, but it may also have and/or comprise a different course, for example a linear one.

A width 15 of the teeth 6 in the circumferential direction 15 increases in the radial direction from the inside towards the outside in the case of internal toothings (or from the outside towards the inside in the case of external toothings) up to the start of the undercut 14. At the start of the undercut, the relative change of the increase becomes less or zero or negative, whereby the undercut 14 is formed by this discontinuity in the course of the flank. In a view in the axial direction 4 (see FIG. 2), the tooth flanks 7 for example do not have a straight course anymore due to the undercut 14.

In the preferred embodiment variant of the teeth 6, the width 15 (continuously) increases from the tooth tip 8 to the undercut 14.

The undercut 14 in the tooth flanks 7 is preferably produced already during powder pressing, meaning during the production of the green compact, by means of a corresponding design of the pressing die, and/or preferably already before post-compacting the tooth flanks 7, whereby the post-compaction of the tooth flanks 7 and/or the tool therefor can be simplified.

Post-compaction of the tooth flanks 7 is carried out starting at the tooth tip 8, at least up to the usable root circle 17, meaning that region of the tooth 6, in which it meshes with the tooth of a further toothing and/or a further gear. It may also be provided that the post-compaction furthermore is carried out in an additional section 18, as it can be seen in the example of FIG. 3. A length 19 of the section 18 may amount to between 1% and 12% of a length 20 of the tooth flanks 7 starting from the tip circle 11.

By sparing the tooth root surfaces of the toothing 2 during deformation, defects disadvantageous for the load capacity of the sintered component 1 can be prevented.

For post-compacting, an allowance 21 of the regions to be post-compacted of the teeth 6 can be provided in the green compact, as it is adumbrated in dashed lines in FIG. 3. According to a preferred embodiment variant of the method, the tooth roots 9 are produced during the pressing of the powder so as to have no allowance at least in the tooth root surface 22 and in a fillet radius at the root 23, so that this shape of these sections of the toothing 2 is defined already during powder pressing. By providing the allowance 21, the undercut 14 can be formed to be more pronounced in the transition region 13.

With the undercuts 14 in the tooth contours, a tool contact with the regions of the toothing 2 not to be post-compacted can be avoided better/more easily during post-compaction.

According to an embodiment variant of the method, post-compaction can be carried out up to a region, which is defined by the usable root diameter 24 plus 10%, in particular plus 5%, of the usable root diameter 24, thus beyond the usable root circle 17 in the direction towards the tooth root surface 22.

In the course of the process, it is further provided that the teeth 6 of the toothing 2 of the sintered component 1 are post-processed by machining. This post-processing by machining takes place after post-compaction. It may further be carried out after hardening the sintered component 1 but preferably takes place before hardening the sintered component 1.

Figure 4:
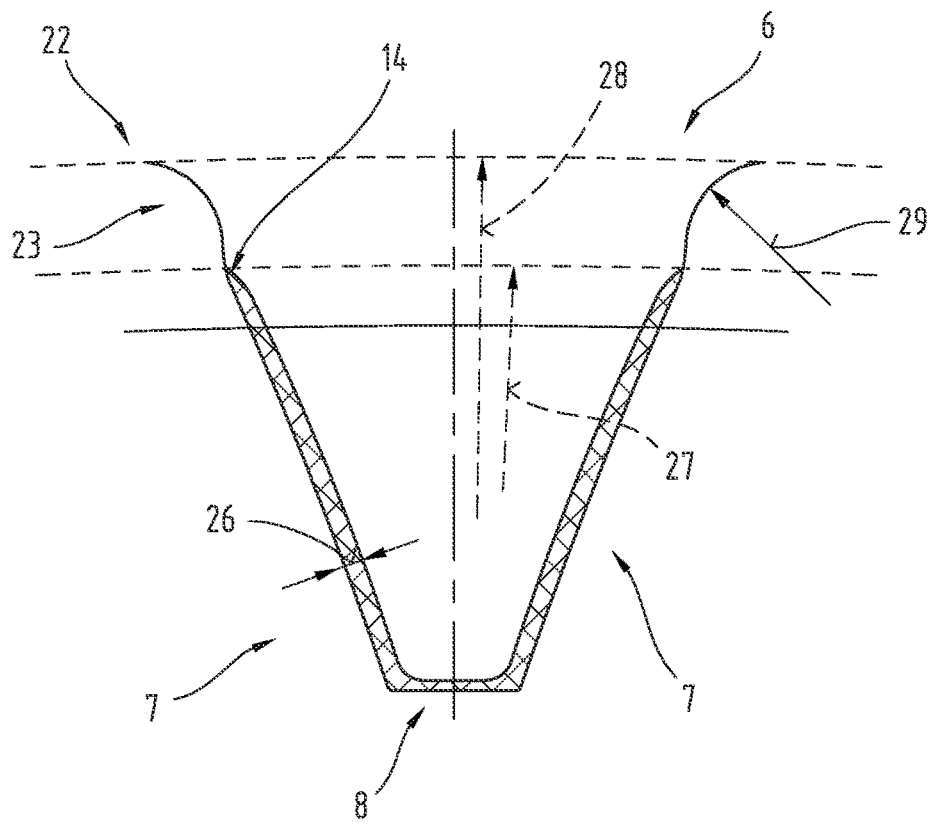
FIG. 4 shows the cutout from the sintered component according to FIG. 3 of an embodiment variant of the sintered component.

Post-processing by machining may take place, for example by milling, planing, reaming, filing, rasping, scraping, or preferably by honing, for example using a honing ring. By post-processing by machining the tooth flanks 7 and possibly the tooth tips 8, a layer thickness 25 (see FIG. 3) of the post-compacted regions is reduced to a layer thickness 26, as it can be seen in FIG. 4. In this regard, the machining tool has no contact to the tooth root surfaces 22 and the root fillet regions 23 due to the undercuts 14.

According to embodiment variant of the method in this regard, it may be provided that the post-processing by machining of the tooth flanks 7 is carried out maximally up to a region, the radius 27 of which deviates from a tooth root circle radius 28 by 0.08% to 12%, in particular by 0.08% to 8%.

As already stated, the region of the tooth roots 9 may have a rounded design. In this regard, it may be provided according to a further embodiment variant of the invention that a fillet radius 29 is selected from a range of 0.2 mm to 8 mm, in particular between 0.2 mm and 4 mm (R0,2 to R8 and/or R4). The fillet of the tooth roots 9 and in particular of the root fillet regions 23 may, in this regard, by formed having only one fillet radius 29 or having a series of multiple different fillet radii 29. In the case of multiple different fillet radii 29, preferably all of them are selected from the mentioned range.

According to a further embodiment variant, it may be provided that the toothing is produced with a module from a range of 0.3 mm to 3 mm, in particular selected from a range of 0.5 mm to 2 mm. Particular in the case of these embodiments of toothings 2, the formation of the undercuts 14 in the tooth flanks 7 is advantageous for preventing contact between the tooth root regions and tools for post-processing the toothing 2.

For the sake of completeness, it should be noted that the module is defined according to DIN 780 as the quotient of pitch circle diameter in mm and the number of teeth. The pitch circle diameter is that diameter of a gear at which the tooth pitch p occurs exactly z times, wherein z is the number of teeth. The tooth pitch is the length of a pitch circle arch between two consecutive flanks of the same name (right-hand or left-hand tooth surfaces).

Figure 5:
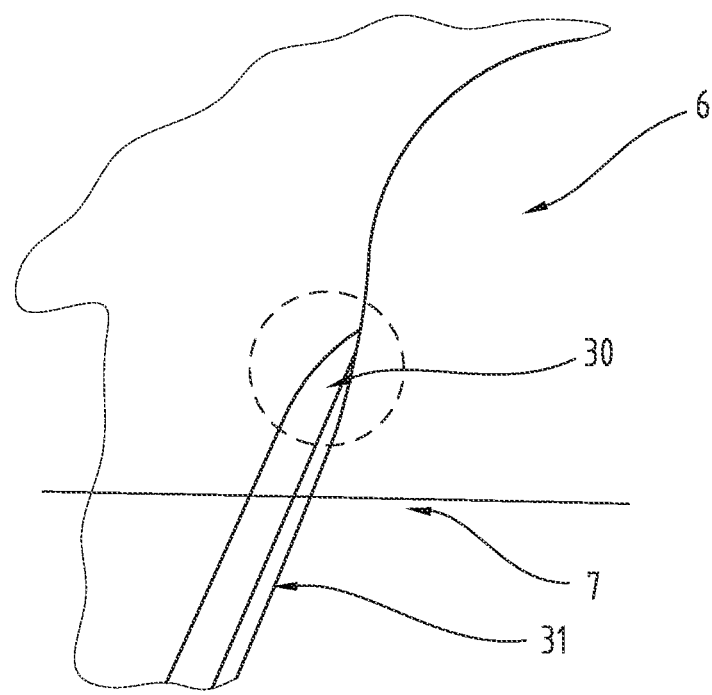
FIG. 5 shows a cutout from another embodiment variant of the sintered component.

FIG. 5 shows a further embodiment variant of the method. As can be seen based on the cutout from a tooth 6, it is possible within the context of the invention that the machining of the tooth flanks 7 ends already before the end of the post-compacted region 30. On that point, FIG. 5 also shows the region 31 of the post-compacted region 30, which is removed by means of machining.

The end of the post-compacted region 30 and the end of the machined region 31 may, however, also coincide.

Figure 6:
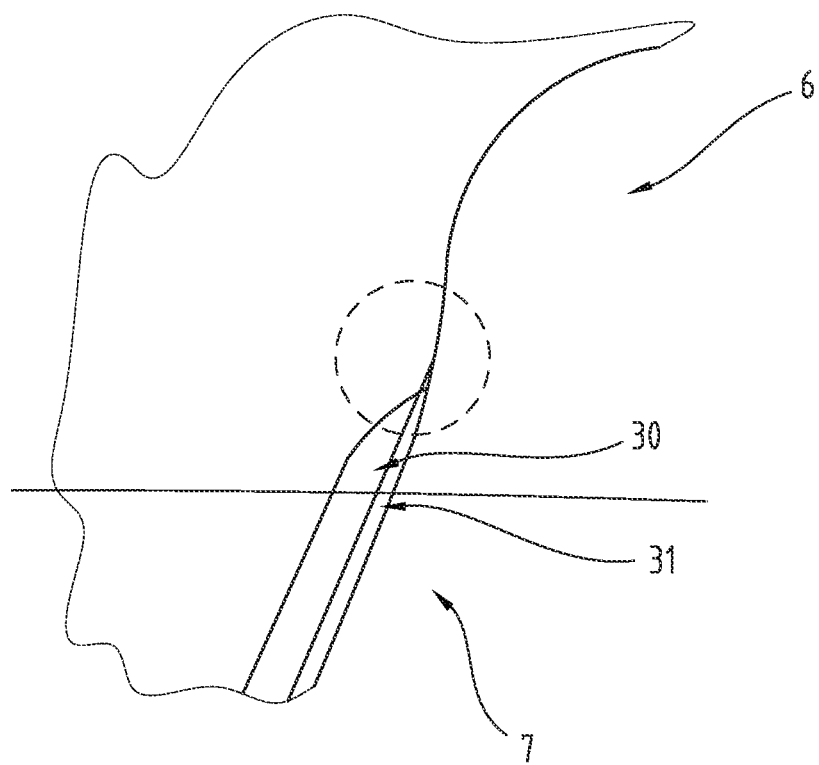
FIG. 6 shows a cutout from a further embodiment variant of the sintered component.

FIG. 6 shows an embodiment variant, in which the region 31 of machining exceeds beyond the region 30 of post-compaction, so that part of the root region that is not post-compacted is also removed by means of machining.

The exemplary embodiments show possible embodiment variants of the sintered component 1, while it should be noted at this point that various combinations of the individual embodiment variants are also possible.

Finally, as a matter of form, it should be noted that for ease of understanding of the structure of the sintered component 1, it is not obligatorily depicted to scale.

Although only a few embodiments of the present invention have been shown and described, it is to be understood that many changes and modifications may be made thereunto without departing from the spirit and scope of the invention.

LIST OF REFERENCE NUMBERS

1 Sintered component
2 Toothing
3 Thickness
4 Axial direction
5 Outer diameter
6 Tooth
7 Tooth flank
8 Tooth tip
9 Tooth root
10 Root circle
11 Tip circle
12 Edge zone
13 Transition region
14 Undercut
15 Width
16 Circumferential direction
17 Usable root circle
18 Section
19 Length
20 Length 21 Allowance
22 Tooth root surface
23 Root fillet region
24 Usable root diameter
25 Layer thickness
26 Layer thickness
27 Radius
28 Tooth root circle radius
29 Fillet radius
30 region
31 region

What is claimed is:

1. A method for producing a sintered component, with a toothing, having teeth with tooth roots, tooth tips and tooth flanks, comprising the steps of
pressing a powder to form a green compact,
sintering the green compact, and
hardening the sintered component once the green compact has been sintered,
wherein after sintering, the tooth flanks are post-compacted and subsequently undergo post-processing by machining,
wherein a transition region between the tooth flanks and the tooth roots has an undercut design, and
wherein post-compaction of the tooth flanks is carried out only up to the transition region.

2. The method according to claim 1, wherein post-compaction is carried out only up to a region separate from the transition region and defined by the usable root diameter plus 10% of the usable root diameter.

3. The method according to claim 1, wherein the tooth roots are produced without an excess of material during the pressing of the powder.

4. The method according to claim 1, wherein the post-processing by machining of the tooth flanks is carried out maximally up to a region, the radius of which deviates from the tooth root circle radius by 0.08% to 12%.

5. The method according to claim 1, wherein the powder has the following composition:
0.1 wt. % to 5 wt. % chromium
0.1 wt. % to 0.8 wt. % carbon
0 wt. % to 2 wt. % molybdenum
0 wt. % to 2 wt. % nickel
remainder iron.

6. The method according to claim 1, wherein the tooth roots are formed in a rounded manner, wherein a fillet radius is selected from a range between 0.2 mm and 8 mm.

7. The method according to claim 1, wherein hardening is carried out by plasma nitriding or plasma nitrocarburizing.

8. The method according to claim 1, wherein the toothing is produced with a module from a range of 0.3 mm to 3 mm.

9. The method according to claim 1, wherein the sintered component is produced as an internal gear.

10. A sintered component produced by the method according to claim 1, the sintered component comprising a toothing having teeth with tooth roots, tooth tips and tooth flanks, wherein the tooth flanks are post-compacted and subsequently undergo post-processing by machining, wherein a transition region between the tooth flanks and the tooth roots has an undercut design, and wherein post-compaction of the tooth flanks is carried out only up to the transition region.

11. The method according to claim 1, wherein after sintering, the tooth tips are post-compacted.

* * * * *